United States Patent [19]

Gibson

[11] Patent Number: 4,991,339
[45] Date of Patent: Feb. 12, 1991

[54] FISHING LURE COUPLING APPARATUS

[76] Inventor: Robert L. Gibson, 5471 Homestead La., Bay City, Mich. 48706

[21] Appl. No.: 419,015

[22] Filed: Oct. 10, 1989

[51] Int. Cl.⁵ .............................................. A01K 85/00
[52] U.S. Cl. ................... 43/42.49; 43/42.36; 24/115 H
[58] Field of Search ............... 43/42.49, 42.08, 42.23; 24/115 H, 129 R

[56] References Cited

U.S. PATENT DOCUMENTS

| | | | |
|---|---|---|---|
| 73,064 | 6/1903 | Wilson | 251/89 |
| 1,242,556 | 10/1917 | Jay | 43/42.23 |
| 1,371,348 | 3/1921 | Brown | 43/42.49 |
| 1,568,325 | 1/1926 | Dewey | 43/42.09 |
| 2,056,506 | 10/1936 | Dopp | 43/28 |
| 2,189,487 | 2/1940 | Davenport | 43/46 |
| 2,215,772 | 9/1940 | Vecchia | 43/46 |
| 2,424,096 | 7/1947 | Janchan | 43/39 |
| 2,665,515 | 1/1954 | Frantello | 43/42.33 |
| 2,784,519 | 3/1957 | Ralston | 43/42.49 |
| 2,832,116 | 4/1958 | Clevett | 24/115 H |
| 3,059,372 | 10/1962 | Hagel | 43/42.09 |
| 3,197,912 | 8/1965 | Kramer | 43/44.4 |
| 3,388,496 | 1/1966 | Good | 43/42.36 |
| 3,500,576 | 3/1970 | Ostrom | 43/42.49 |
| 3,535,814 | 10/1970 | O'Brien | 43/42.49 |
| 3,899,847 | 8/1975 | Dworski | 43/42.36 |
| 4,006,552 | 2/1987 | Cunningham | 43/42.48 |

Primary Examiner—Richard K. Seidel
Assistant Examiner—Chuck Y. Mah
Attorney, Agent, or Firm—John J. Swartz

[57] ABSTRACT

Apparatus for coupling a fishing line to a fishing lure. The apparatus includes a pin having a laterally inner portion coupled to the lure, for receiving a lure coupling loop and a laterally outer large portion for inhibiting lateral displacement of the lure coupling loop from the laterally inner portion. The apparatus further includes an adjustable lure coupling loop which is expansible and contractable to provide an eyelet having a reduced size for coupling to the laterally inner portion of the pin and a expanded size to be removed from the laterally inner portion of the pin.

57 Claims, 3 Drawing Sheets

FISHING LURE COUPLING APPARATUS

BACKGROUND OF THE INVENTION

1. Field of the Invention

This invention relates to apparatus for coupling a fishing lure to a fishing line and more particularly to a new and novel coupling pin received by an aperture, provided in the forward end of a fishing lure, which receives a new and novel loop coupling member that is secured to a fishing line.

2. Description of Prior Art and Objects

One conventional fishing lure comprises a flat or curved metal plate which is sometimes referred to as a "spoon". Such lures typically have an aperture in the forward end thereof for receiving a fishing line or a connector coupled to a fishing line.

Apparatus has been provided heretofor for coupling a fishing line to such a fishing lure. One such prior device includes a snap hook or connecting link such as that disclosed in U.S. Pat. No. 730,064 issued to E. W. Wilson, on June 2, 1903 and the U.S. Pat. No. 3,059,372 issued to R. J. Hagel on Oct. 23, 1962. Such snap hooks have an eyelet for receiving a fishing line and a manually openable and closable hook for passing through the lure aperture. Such snap hooks are relatively difficult to manipulate and "snap-on" and "snap-off", particularly if the fisherman is plagued with arthritic hands.

Another typical device for attaching a fishing lure to a fish line includes a split ring of the type disclosed in the U.S. Pat. No. 2,056,506 issued to G. W. Dopp on Oct. 6, 1936 as well as U.S. Pat. No. 3,059,372 issued to R. J. Hagel on Oct. 23, 1962. The split ring is received by the aperture at the front end of the lure. The fishing line must still be threaded through the split ring or coupled thereto via the aforementioned snap hook. The split ring is also difficult to install and remove.

Accordingly, as an object of the present invention to provide new and novel apparatus for coupling a fishing lure to a fishing line.

It is another object of the present invention to provide lure coupling apparatus of the type described including a line coupling pin which is coupled to the lure and includes a laterally inner line receiving portion and a laterally outer line retaining portion for inhibiting inadvertent lateral displacement of the line.

Another object of the present invention is to provide lure coupling apparatus of the type described including a pin having a shank which attaches to the lure for receiving a line coupling loop and an enlarged, laterally outer line retaining head for precluding the line coupling loop from being inadvertently laterally displaced from the shank.

A further object of the present invention is to provide lure coupling apparatus of the type described including a laterally extending pin which is laterally received by an aperture in a lure and includes enlarged terminal end portions on laterally opposite sides of the lure.

A still further object of the present invention is to provide lure coupling apparatus of the type described including a yieldable member for urging the pin to a loop clamping position but allowing it to move to a laterally adjusted, loop releasing and loop receiving position.

In one embodiment, the invention contemplates that the fisherman may want to alternatively use a snap hook of the type described heretofor. Accordingly, it is an object of the present invention to provide lure coupling apparatus of the type described which includes an auxiliary plate for coupling to a conventional snap hook connector.

It is a still further object of the present invention to provide lure coupling apparatus of the type described including a generally U-shaped rod having a base received by the lure aperture and a pair of rearwardly extending legs extending from the base bearing against opposite sides of the lure, one of the legs being yieldable for laterally movement relative to the lure to allow a draft line to be received therebetween.

Still another object of the present invention is to provide lure coupling apparatus of the type described including an adjustable loop for coupling to a pin extending laterally outwardly of a fishing lure.

A further object of the present invention is to provide lure coupling apparatus of the type described including a line coupled back on itself to form a loop defining a loophole and mechanism for adjusting the size of the loophole including at least one hollow connecting member slidably mounted on confronting portions of the line with a snug, slip fit.

Yet a still further object of the present invention is to provide lure coupling apparatus of the type described wherein at least one ring is slidably mounted on confronting portions of a loop defining line for movement to various positions to adjust the size of the loop to any one of a plurality of different sizes.

Another object of the present invention is to provide lure coupling apparatus of the type described including loop forming mechanism for securing the terminal end of a line to an upstream portion of the line and slidably mounting a plurality of hollow loop closure members on confronting portions of the line to adjust the size of the loop.

It is another object of the present invention to provide lure coupling apparatus of the type described including a spring member yieldably urging the hollow, loop closure members to spaced apart positions but allowing the hollow loop closure members to be longitudinally moved on the confronting line portions to adjacent, loop locking positions.

These and other objects of the present invention will become more readily apparant to those with ordinary skill and art as the description there proceeds.

SUMMARY OF THE INVENTION

Apparatus for coupling a fishing line to a fishing lure including an adjustable loop having an adjustable eyelet which can be expanded and contracted between a reduced size for coupling to the lure and an enlarged size removed from the lure. The apparatus contemplates a new and novel loop receiving pin received by an aperture in the forward end of the lure for receiving the loop.

BRIEF DESCRIPTION OF THE DRAWINGS

The invention may be more readily understood by referring to the accompanying drawings, in which:

FIG. 10 is a side elevational view, partly in section, illustrating a further slightly modified construction;

FIG. 11 is a sectional plan view, taken along the line 11—11 of FIG. 10;

FIG. 12 is a side elevational view, partly in section, of another modified embodiment; and FIG. 13 is a sectional plan view, taken along the line 13—13 of FIG. 12.

DESCRIPTION OF PREFERRED EMBODIMENT

Figure 1:
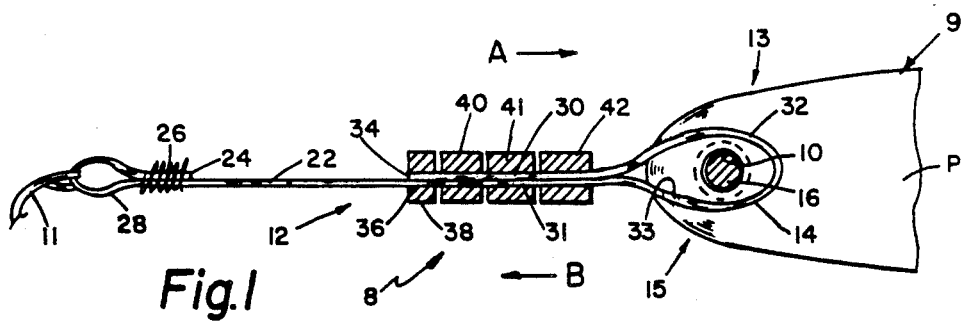
FIG. 1 is a sectional side elevational view of lure coupling apparatus constructed according to the present invention, taken along the line 1-1 of FIG. 3, illustrating a new and novel adjustable line coupling loop member in one enlarged position of adjustment for receiving a new and novel coupling pin mounted on the lure.

Apparatus, generally designated 8, is provided for coupling a fishing lure, generally designated 9, to a fishing line 11. The lure 9 may suitably comprise a flat metal plate P, sometimes referred to as a spoon, having an aperture 10 in the front end 13 thereof. The apparatus 8 includes a coupling member 12, coupled at one end to line 11 and at its opposite end 14 to a transverse pin, generally designated 15, having a shank 16 received in lure aperture 10.

The coupling line member 12 includes a length of line 22 which may suitably comprise nylon or other fishing line similar to the line 11. The length of line 22 includes one end 24 folded over on itself and secured itself with a crimping ring 26 to form a loop 28 which receives, and is tied or otherwise suitably connected to, the fishing line 11.

Figure 2:
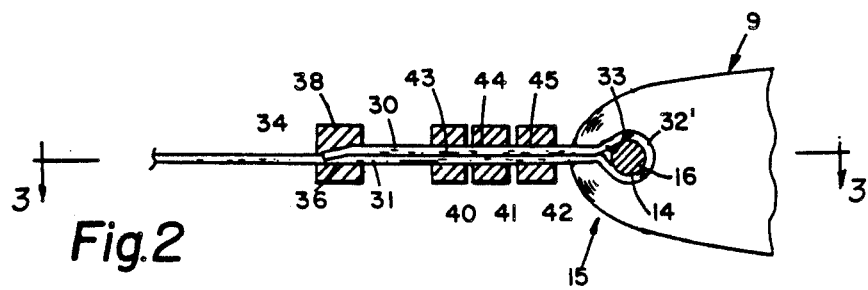
FIG. 2 is a similar view, taken along a line 2-2 of FIG. 3, illustrating the adjustable line coupling loop in an adjusted position wherein the loop is of a reduced size coupled to the lure mounted pin.
Figure 3:
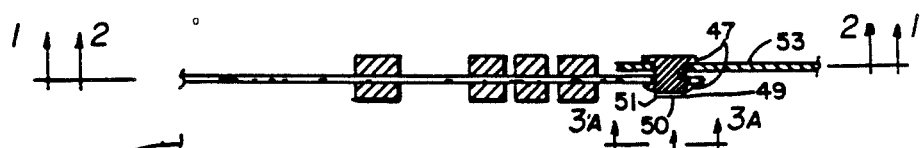
FIG. 3 is a sectional plan view, taken along a line 3—3 of FIG. 2.
Figure 3A:
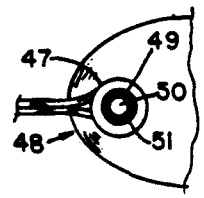
FIG. 3A is a side elevational view taken along a line 3A—3A of FIG. 3, more particularly illustrating an eye of the lure.

The opposite end line portion 30 of the line 22 is folded over on an upstream line portion 31 to form an adjustable loop or eyelet, generally designated 32. The terminal line end 34 is fixed to an upstream line portion 36 via a crimping ring 38. The size of the loop 32, and loophole 33 defined thereby, can be adjusted via a plurality of hollow beads, designated 40, 41 and 42 which are slidably received on the confronting line portions 30, 31 downstream of the crimping ring 38. The beads 40, 41 and 42 may be adjusted from the loop enlarging positions, illustrated in FIG. 1, to the loop diminishing positions, illustrated in FIGS. 2 and 3, to reduce the size of loop 32 from the pin receiving position illustrated in FIG. 1 to the pin gripping position illustrated at 32' in FIG. 2.

The hollow beads 40, 41 and 42 include apertures 43, 44 and 45, respectively, which slidably but snugly receive the confronting line portions 30, 31 in frictional engagement. In the closed or pin gripping position illustrated at 32' in FIG. 2, the reduced diameter loop 32' will grip the shank 16 of the pin 15.

The transverse pin shank 16 is slidably received in an aperture 10 at the forward end 13 of lure 9. The pin 15 includes enlarged diameter heads 47 on opposite terminal ends of shank 16 for retaining the shank 16 in aperture 10.

The lure coupling loop 32, in the enlarged position illustrated in FIG. 1, is passed over one of the enlarged pin heads 47 to a position abutting one side 53 of lure 9. The beads 40-42 are then moved from the loop enlarging positions, illustrated in FIG. 1, to the loop reducing positions illustrated in FIG. 2, to reduce the size of lure coupling loop 32 to the pin gripping size illustrated at 32' in FIG. 2. The enlarged head 47 then precludes laterally outward displacement of the loop 32' along the axis of the shank 16.

Indicia, generally designated 48, it is provided on the laterally outer faces 49 of the enlarged heads 47 and includes a generally circular central layer of 50 of black indicia surrounded by an annular ring 51 of white indicia to provide the appearance of an "eye".

THE OPERATION

The fishing line 11 is tied to the loop 28 provided at the forward end of the coupling member 12. The beads 40, 41 and 42 are moved to positions illustrated in FIG. 1 whereby the loop 32 will be enlarged as illustrated in FIG. 1.

The loop 32 is passed over one enlarged diameter head 47 to a position abutting one side face 53 of lure 9 and overlying a portion of pin shank 16 as illustrated in FIG. 1. The beads 40, 41 and 42 are then moved in the direction of the arrow A along the confronting line portions 30, 31 to the loop reducing position illustrated in FIGS. 2 and 3 so that the loop 32 is closed to the reduced pin gripping position illustrated at 32' in FIG. 2.

When it is desired to replace the lure 9 with another lure, the beads 40, 41 and 42 are merely slid in a reverse direction, represented by the arrow B, to the loop enlarging positions illustrated in FIG. 1 whereby the resilient nature of the line will cause the loop 32 to again expand to the pin receiving position illustrated in FIG. 1.

ALTERNATE EMBODIMENT

Figure 4:
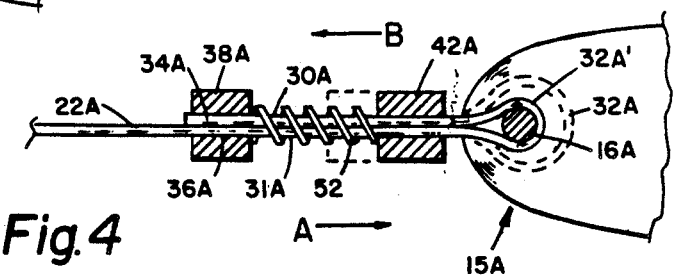
FIG. 4 is a sectional side view illustrating a slightly modified construction.

A slightly modified construction is illustrated in FIG. 4 and generally similar parts will be referred to by generally similar numerals followed by the letter A subscript. This embodiment is generally similar to that illustrated in FIGS. 1-3 except that the hollow beads 40 and 41 are replaced by a hollow cylindrical coil spring 52 which is slidably disposed on the confronting line portions 30A and 31A and reacts between the crimping ring 38A and the bead 42A. The spring 52 yieldably urges the bead 42A to the loop diminishing position, illustrated in solid lines in FIG. 4 in which the loop 32A is in the reduced, closed pin gripping position illustrated in solid lines at 32A' in FIG. 4. The spring 52 does yield to allow the bead 42A to move lengthwisely on the line 22A to the loop enlarging position, illustrated in chain lines in FIG. 4, to allow the loop 32A to increase in size to the pin receiving position illustrated in chain lines in FIG. 4.

Figure 5:
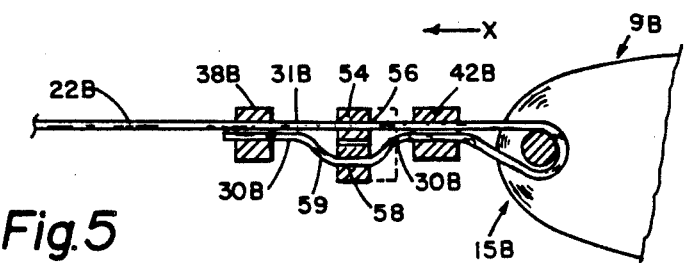
FIG. 5 is a sectional side view illustrating a further slightly modified construction.

A further slightly modified construction illustrated in FIG. 5 and generally similar parts will be referred to by identical reference characters followed by the letter subscript B. This embodiment is generally similar to that illustrated in FIGS. 1–3 except that the beads 40 and 41 are replaced by a central bead 54 slidably received on the confronting line portions 30B and 31B betwen the crimping ring 388 and the bead 42B. The bead 54 includes a pair of laterally spaced apart apertures 56 and 58 which receive the confronting line portions 30B and 318. As illustrated, the portion 59 of line 30B received by aperture 58 is displaced out of the plane of the balance of line portin 30B. The bead 54 acts as a locking bead which, when moved to the locking position illustrated in chain lines in FIG. 5, inhibits movement in the direction of the arrow X of the bead 42B from the loop diminishing position, illustrated in chain lines in FIG. 5, to the loop enlarging position, illustrated in solid lines in FIG. 5.

Figure 6:
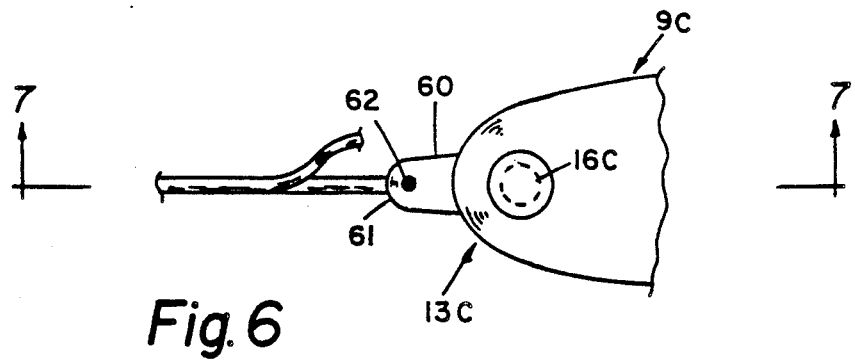
FIG. 6 is a side elevational view illustrating another modified embodiment.
Figure 7:
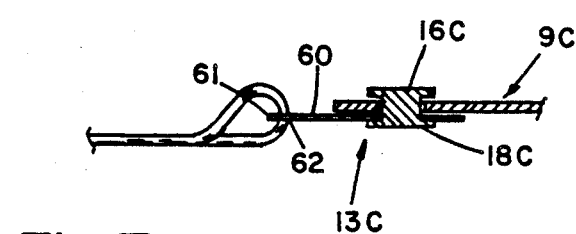
FIG. 7 is a sectional underplan view taken along the line 7—7 of FIG. 6.

Referring now to the embodiment illustrated in FIGS. 6 and 7, an auxiliary plate, generally designated 60, is pivotally mounted on the shank 16C and includes a forward end 61 which projects forwardly of the forward end 13C of the fish lure 9C. The forward end 61 of plate 60 includes an aperture 62 which can receive a conventional snap hook. In the event that the fisherman does not have a loop connector as described hereinbefore, he can connect the conventional snap hook in auxiliary plate aperture 62.

Figure 8:
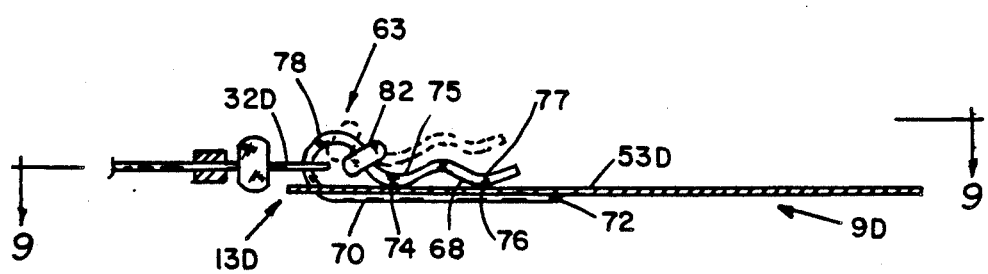
FIG. 8 is a sectional under plan view, taken along the line 8—8 of FIG. 9 and illustrating a slightly further modified construction.
Figure 9:
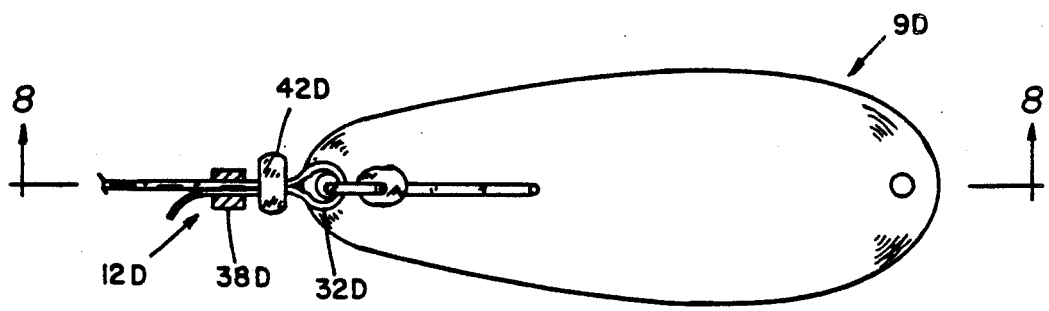
FIG. 9 is a sectional side view, taken along the line 9—9 of FIG. 8.

Referring now more particularly to FIGS. 8 and 9, a still further modified construction is illustrated wherein generally similar parts are identified by generally similar reference characters followed by the letter D subscript. A generally U-shaped coupling pin member, generally designated 63, is provided and includes a base member 13D coupled to a pair of longitudinally extending legs 68 and 70. The leg 70, which is generally linear, is soldered or otherwise suitable fixed at 72 to one side 53D of the lure 9D. The U-shaped member 63 comprises yieldable material which allows the opposite leg 68 to laterally outwardly move from the position illustrated in solid lines in FIG. 8, abutting the opposite lure face 53D, to the removed position illustrated in chain lines, in a direction of the arrow Y, to receive the loop 32D. The portions 75 and 77 of leg 68 adjacent the base 13D form a loop 78 for receiving adjustable loop coupling member 32D. The leg 68 also includes a polarity of undulations 74 and 76 which normally abut the face 53D of the lure to preclude the loop 32D from passing outwardly therebetween. The plane of U-shaped member 63 is perpendicular to the plane of the lure 9D and the plane of loop 32D.

To further preclude the escape of the loop 32D from the loop 78, a bead 82 is slidably received on the leg 68 upstream of undulation 74 to slidably move from the position illustrated in the chain lines to allow the loop 32D to pass between the leg 68 and the face 53D of the lure 9D and the position illustrated in solid lines to inhibit the removal of the line 32D therebetween.

The coupling member 12D distinguishes from the coupling member 12 in that the beads 40 and 41 are eliminated and only crimping beads 38D and adjustable bead 42D are provided.

Referring now more particularly to the embodiment illustrated in FIGS. 10–13, a still further modified construction is illustrated wherein generally similar characters are referred to by generally similar referenced characters followed by the letter E subscript. The pin 15E includes a coil spring 86 disposed on the shank 16E between one enlarged head 47E and the face 53E of lure 9E to urge the pin 15E to the position illustrated in FIG. 11 in which the opposite enlarged pin head 47E′ abutts lure face 53E. The coil spring 86 allows lateral movement of pin 15E in the direction represented by the arrow 88 to the loop receiving position illustrated in chain lines in FIG. 11 in which the head 47E′ is spaced from the lure face 53E so that the loop 32E can be received between the head 47E′ and lure face 53E.

The loop connector 32E differs from the loop connector 32 in that the terminal lure end 33E is not crimped or fixed to the line portion 36 but rather is knotted as illustrated at 90 and is freely received in the opening 45E of a slidable bead 42E.

The lure 9E is further illustrated as including another identical pin 15F identical to pin 15E received in an aperture 10F provided in the rear end 94 of the lure 9E. A hook 96 is coupled to the rear end 94 of the lure via a line 98. The line 98 is selected such that the tensile force necessary to break the 98 will be somewhat less than the tensile force required to break the line 32E. In the event that the hook 96 becomes caught on an underwater log or the like, the line 98 will break before the line 32E so that only the hook 96 is lost instead of the entire lure being lost. For example, the line 98 might be four pound test whereas the line 32E might be eight pound test.

It is to be understood that the drawings and descriptive matter are in cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for drawing a fishing lure through water comprising:
   draft line means including
      adjustable loop means having adjustable eyelet means adjustable between a reduced size for coupling to said lure and an enlarged size removed from said lure;
   pin means for attachment to lure for receiving said loop means when said eyelet means is in said reduced size;
   said pin means including a shaft mountable on said lure and means for inhibiting transverse movement of said loop means, in said reduced size, on said pin means including an enlarged head on said shaft over which said loop means passes when said eyelet means is in said enlarged size; and
   means for mounting said pin means on said lure for transverse movement relative thereto between a rest position in which said head is adjacent said lure and a removed, line receiving position.

2. The apparatus set forth in claim 1 wherein yieldable means is mounted on said pin means for reacting between said pin means and said lure to yieldably urge said pin means to said rest position but allowing said pin means to move to said line receiving position.

3. The apparatus set forth in claim 2 wherein said yieldable means comprises spring means.

4. Apparatus for drawing a fishing lure through water comprising:
   draft line means including
      adjustable loop means having adjustable eyelet means adjustable between a reduced size for coupling said lure and an enlarged size removed from said lure;

pin means for attachment to said lure for receiving said loop means when said eyelet means is in said reduced size; and plate means mounted on said pin means including an opening therein for receiving a draft line.

5. Apparatus for drawing a fishing lure through water comprising:

draft line means including adjustable loop means having adjustable eyelet means adjustable between a reduced size for coupling to said lure and an enlarged size removed from said lure;

pin means for attachment to said lure for receiving said loop means when said eyelet means is in said reduced size;

said pin means including one end portion adapted to be fixed to said lure, an intermediate portion adapted to be spaced from said lure to define a receptable for receiving said loop means; and a terminal end adapted to be adjacent, but movable relative to said lure to allow said loop means to pass between said terminal end and said lure to be received between said intermediate portion and said lure.

6. Apparatus for drawing a fishing lure through water comprising:

draft line means including adjustable loop means having adjustable eyelet means adjustable between a reduced size for coupling to said lure and an enlarged size removed from said lure;

pin means for attachment to said lure for receiving said loop means when said eyelet means is in said reduced size;

said pin means comprising a loop member having one end adapted to be fixed to said lure and an opposite end yieldable between a position removed from said lure means to allow said loop means to pass therebetween and a position adjacent to said lure inhibiting the passage of said loop means between said opposite end and said lure.

7. The apparatus set forth in claim 6 wherein said loop member lies in a plane perpendicular to the plane of said loop means.

8. The apparatus set forth in claim 6 wherein said loop member includes a plurality of undulations adjacent the terminal end thereof.

9. Apparatus for drawing a fishing lure through water comprising:

draft line means including adjustable loop means having adjustable eyelet means adjustable between a reduced size for coupling to said lure and an enlarged size removed from said lure;

said draft line means comprising a draft line having an upstream line portion and a downstream terminal end portion;

said adjustable loop means comprising ring means receiving said upstream line portion and said downstream terminal end portion and movable along the length of said upstream line portion to adjust the size of said eyelet means;

means securing said terminal end portion to a part of said upstream line portion; and pin means adapted to be coupled to said lure, for receiving said loop means;

said ring means being slidably disposed on said loop means between said securing means and said pin means.

10. The apparatus set forth in claim 9 including means reacting between said securing means and said ring means yuieldably urging said ring means toward said pin means.

11. Apparatus for detachably coupling a fishing line to a fishing lure for drawing the lure in a longitudinal path of travel comprising:

transversely extending pin means adapted to be coupled to said fishing lure; and adjustable loop means detachably received on said pin means and adapted to be coupled to said fishing line;

said adjustable loop means comprising line means coupled on itself;

hollow loop closure means slidably mounted on said line means for adjusting the size of said loop means; and means for mounting said pin means on said lure for transverse movement.

12. Apparatus for detachably coupling a fishing line to a fishing lure for drawing the lure in a longitudinal path of travel comprising:

transversely extending pin means adapted to be coupled to said fishing lure; and adjustable loop means detachably received on said pin means and adapted to be coupled to said fishing line;

said adjustable loop means comprising line means coupled on itself; and yieldable means for reacting between said lure and a portion of said pin means to yieldably urge said pin means in one transverse direction but allowing said pin means to move in an opposite transverse direction.

13. The apparatus set forth in claim 12 wherein said pin means includes a shank of a predetermined diameter and an enlarged diameter terminal head over which said loop means passes.

14. Apparatus for detachably coupling a fishing line to a fishing lure comprising:

line means, adapted to be coupled to said fishing line, including an upstream line portion and a downstream line portion curved back on, and in juxtaposition with, said upstream line portion to form a loop defining a loophole;

loophole adjustment means for adjusting the size of said loophole including means slidably mounted on said upstream and downstream portions; and means precluding relative movement of said upstream and downstream portions along the length of said line means.

15. Apparatus for detachably coupling a fishing line to a fishing lure comprising:

line means, adapted to be coupled to said fishing line, including an upstream line portion and a downstream line portion curved back on, and in juxtaposition with, said upstream line portion to form a loop defining a loophole;

loophole adjustment means for adjusting the size of said loophole including means slidably mounted on said upstream and downstream portions; and pin means for mounting on said lure to receive said loop.

16. The combination set forth in claim 15 including additional line means for coupling said lure to a fish hook; the tensile strength of said additional line means being less than the tensile strength of said draft line means.

17. The apparatus set forth in claim 15 wherein said loop hole adjustment means comprises ring means receiving said upstream line portion and said downstream line portion and movable along the length of said upstream line portion to adjust the size of said eyelet means.

18. The apparatus set forth in claim 17 wherein said ring means comprises a plurality of rings.

19. The apparatus set forth in claim 17 wherein one of said rings has first and second apertures therethrough slidably receiving first and second portions of said draft line in laterally spaced apart positions.

20. The apparatus set forth in claim 17 including means securing said downstream line portion to a part of said upstream line portion.

21. The apparatus set forth in claim 17 wherein said adjustable loop means includes a loop adjuster having at least one aperture therein slidably receiving at least said upstream line portion for movement thereon between a loop enlarging portion and a loop diminishing position.

22. The apparatus set forth in claim 5 including means for mounting said pin means for transverse movement on said lure.

23. The apparatus set forth in claim 22 including yieldable means yieldably urging said pin means transversely in a direction to one position but allowing said pin means transversely move in the opposite direction to a removed position for receiving said loop.

24. The apparatus set forth in claim 23 wherein said pin means includes a shank mounting an enlarged head which abuts said lure in said one position but is removed therefrom in said removed position.

25. The apparatus set forth in claim 15 wherein said pin means comprises a loop forming member for receiving said loop means and being disposed in a plane generally normal to the plane of said loop.

26. The apparatus set forth in claim 25 wherein said loop forming member comprises a pair of longitudinally extending legs each joined at one end to said one end of the other leg, one said legs being adapted to be disposed on opposite sides of said lure.

27. In combination:
a longitudinally extending fishing lure having a transverse aperture therethrough;
pin means received by said aperture; and
adjustable loop means having eyelet means adjustable to any selected one of a plurality of different positions between a reduced size receiving said pin means and an enlarged size for freely passing over said pin means to a removed location;
said pin means being generally U-shaped and including one leg on one side of said lure and another leg on the opposite side of said lure, and a coupling base member spanning said legs and received by said aperture.

28. The combination set forth in claim 27 wherein said one leg is generally linear and said another leg is curvilinear and includes a loop portion defining a loop for receiving said loop means.

29. The combination set forth in claim 28 wherein the terminal end of said another leg is abutting said lure; said another leg being yieldable to allow said another leg to move in a direction away from said lure to receive said loop means.

30. The combination set forth in claim 27 wherein said pin means includes a shank received by said aperture and an enlarged head having a laterally outer surface; and further including indicia means on said laterally outer surface for forming the appearance of an eye.

31. In combination:
a longitudinally extending fishing lure having a transverse aperture therethrough;
pin means received by said aperture; and
adjustable loop means having eyelet means adjustable to any selected one of a plurality of different positions between a reduced size receiving said pin means and an enlarged size for freely passing over said pin means to a removed location;
said pin means including a shank received by said aperture and an enlarged head having a laterally outer surface; and
indicia means on said laterally outer surface for forming the appearance of an eye.

32. The combination set forth in claim 31 wherein said indicia means includes a central, circular layer of indicia and an annular strip of indicia encircling said central circular indicia.

33. The combination set forth in claim 32 wherein said central circular layer of indicia is of a first predetermined shade and said annular strip has a substantial darker contrasting shade.

34. The combination set forth in claim 33 wherein said central circular layer is black and said annular layer is white.

35. In combination with a longitudinally extending fishing lure
means for attaching said lure to a draft line comprising
pin means having
a laterally inner pin portion coupled to said lure for receiving said line and
laterally outer draft line securing means for inhibiting the lateral movement of said line relative to said laterally inner pin portion.

36. The combination set forth in claim 35 including a laterally extending aperture through said lure;
said laterally inner portion including a shank received by said aperture.

37. The combination set forth in claim 35 wherein said shank is freely movable in said aperture; said laterally outer, draft line securing means comprising an enlarged head on one laterally outer end of said shank.

38. The combination set forth in claim 37 wherein said shank is laterally movable in said aperture between an inoperative position in which said enlarged head is adjacent said lure and a fish line receiving position in which said enlarged head is spaced from said lure.

39. The combination set forth in claim 38 including yieldable means yieldably urging said pin means to said inoperative position but allowing movement thereof to said fish line receiving position.

40. The combination set forth in claim 36 wherein said pin means comprises a generally U-shaped rod having a base received by said aperture and a pair of legs coupled to said base for abutting opposite side of said lure.

41. The combination set forth in claim 40 wherein said pin means is yieldable to allow one of said legs to move relative to the other of said legs between a line receiving position laterally spaced from said lure and a line securing position abutting said lure.

42. The combination set forth in claim 38 wherein said auxiliary coupling means comprises a plate mounted on said pin means for pivotal movement between a stowed position and a position in which said fish line receiving portion is positioned forwardly of the forward end of said lure.

43. The combination set forth in claim 42 wherein said fish line receiving portion includes an aperture therethrough for receiving a fishing line.

44. The combination set forth in claim 39 wherein said laterally outer draft line securing means includes an enlarged stop on the laterally opposite end of said shank;

said yieldable means reacts between said lure and said enlarged stop.

45. The combination set forth in claim 44 wherein said yieldable means comprises spring means received by said shank.

46. The combination set forth in claim 35 further including auxilliary coupling means mounted on said pin means and including a fish line receiving portion.

47. The combination set forth in claim 35 including adjustable loop means having eyelet means adjustable between a reduced size receiving said pin means and an enlarged size for removal.

48. The combination set forth in claim 35 comprising:
draft line means including
adjustable loop means having adjustable eyelet means adjustable between a reduced size for coupling to said laterally inner pin portion and an enlarged size removed from pin means.

49. The combination set forth in claim 48 wherein said draft line means comprises a draft line having an upstream line portion and a downstream terminal end portion; said adjustable loop means comprises ring means receiving said upstream line portion and said downstream terminal end portion and movable along the length of said upstream line portion to adjust the size of said eyelet means.

50. The apparatus set forth in claim 49 wherein said ring means comprises a plurality of rings.

51. The apparatus set forth in claim 49 wherein one of said rings has first and second apertures theretroughs slidably receiving first and second portions of said draft line in laterally spaced apart positions.

52. The apparatus set forth in claim 49 including means securing said terminal end portion to a part of said upstream line portion.

53. The apparatus set forth in claim 49 wherein said draft line means comprises a draft line having an upstream line portion and a downstream terminal end portion; said adjustable loop means including a loop adjuster having at least one aperture therein slidably receiving at least said upstream line portion for movement therein between a loop enlarging portion and a loop diminishing position.

54. The combination set forth in claim 35 wherein said pin means comprises an elongate rod member including said laterally inner pin portion adjacent said lure, said laterally outer draft line securing means including a laterally outer pin portion in spaced relation with said lure; said rod means including a distal end portion abutting said lure, said rod member being movable to allow said distal end portion to move from a position abutting said lure to a laterally spaced position to allow a fishing line to pass therebetween.

55. The combination set forth in claim 54 including fish line securing means mounted on said rod member for longitudinal movement to allow a fish line to pass longitudinally forwardly between said distal end portion and said lure but inhibiting longitudinal rearward movement of said fish line between said distal end portion and said lure.

56. The combination set forth in claim 55 wherein said fish line securing means comprises a bead having an aperture therethrough slidably receiving said rod member.

57. The combination set forth in claim 56 wherein said distal end portion includes a plurality of undulations.

* * * * *